US011242066B2

(12) United States Patent
Choi (10) Patent No.: US 11,242,066 B2
(45) Date of Patent: Feb. 8, 2022

(54) VEHICLE CONTROL APPARATUS AND VEHICLE CONTROL SYSTEM AND VEHICLE CONTROL METHOD THEREOF

(71) Applicant: Mando Corporation, Pyeongtaek-si (KR)

(72) Inventor: Chi Gun Choi, Yongin-si (KR)

(73) Assignee: MANDO MOBILITY SOLUTIONS CORPORATION, Pyeongtaek-si ( * ) Notice: Subject to any disclaimer, the term of this patent is extended or adjusted under 35 U.S.C. 154(b) by 58 days.

(21) Appl. No.: 16/812,457

(22) Filed: Mar. 9, 2020

(65) Prior Publication Data

US 2020/0283007 A1  Sep. 10, 2020

(30) Foreign Application Priority Data

Mar. 8, 2019  (KR) .................. 10-2019-0026748

(51) Int. Cl.
*B60W 50/029* (2012.01)
*B60W 50/035* (2012.01)
*B60W 50/02* (2012.01)
*B60W 60/00* (2020.01)
*G07C 5/00* (2006.01)

(52) U.S. Cl.
CPC ...... *B60W 50/029* (2013.01); *B60W 50/0225* (2013.01); *B60W 50/035* (2013.01); *B60W 60/0018* (2020.02); *B60W 60/0059* (2020.02); *G07C 5/008* (2013.01); *B60W 2050/0292* (2013.01)

(58) Field of Classification Search
CPC .......... B60W 50/029; B60W 60/0059; B60W 60/0018; B60W 50/0225; B60W 50/035; B60W 2050/0292; G07C 5/008

USPC .......................................................... 701/27
See application file for complete search history.

(56) References Cited

U.S. PATENT DOCUMENTS

| 7,103,460 B1 * | 9/2006 | Breed ................. B60C 23/0408 701/29.1 |
| 2005/0125117 A1 * | 6/2005 | Breed .................... G07C 5/008 701/31.5 |

FOREIGN PATENT DOCUMENTS

| JP | 6201916 B2 | 9/2017 |
| KR | 10-0378675 B1 | 3/2003 |
| KR | 10-1747375 B1 | 6/2017 |
| KR | 10-2018-0022473 A | 3/2018 |
| KR | 20180022473 | * 3/2018 |

* cited by examiner

*Primary Examiner* — Gertrude Arthur Jeanglaude
(74) *Attorney, Agent, or Firm* — Hauptman Ham, LLP

(57) ABSTRACT

The present disclosure is related to a vehicle control apparatus, a vehicle control system and a vehicle control method thereof. In particular, the present disclosure provides a vehicle control apparatus comprising: a communication device for communicating with a remote control center; and a controller configured to determine a state of each of one or more component devices related to the vehicle performing an autonomous driving, and to generate and output a determination result signal, determine a driving mode of the vehicle as one of a remote driving mode, an emergency action mode, or an autonomous driving maintenance mode based on the determination result signal, and control the vehicle according to the driving mode determined by the driving mode determiner.

18 Claims, 8 Drawing Sheets

VEHICLE CONTROL APPARATUS AND VEHICLE CONTROL SYSTEM AND VEHICLE CONTROL METHOD THEREOF

CROSS REFERENCE TO RELATED APPLICATION

This application claims priority from Korean Patent Application No. 10-2019-0026748, filed on Mar. 8, 2019, which is hereby incorporated by reference for all purposes as if fully set forth herein.

BACKGROUND OF THE INVENTION

1. Field of the Invention

The present disclosure relates to a vehicle control apparatus, a vehicle control system and a vehicle control method thereof.

2. Description of the Prior Art

In recent years, vehicles capable of autonomous driving have been produced, and the technology for unmanned autonomous driving has been rapidly developed. A vehicle capable of performing such autonomous driving has an advantage of making the passenger and the driver more convenient.

Autonomous driving technology basically controls the behavior of the vehicle by sensing the surroundings of the vehicle or the driving information of the vehicle by the sensor mounted on the vehicle, and generating a control signal using the sensed information and outputting the control signal to the driving device of the vehicle.

However, in the case that a sensor, a controller, a driving device or the like fails, or the sensor cannot recognize the surroundings of the vehicle due to heavy rain or heavy snow, it is difficult for the vehicle to perform autonomous driving.

In this case, the driver may drive manually. However, if the driver's health may deteriorate, the manual driving may not be possible. In addition, the manual driving may not be possible in the unmanned autonomous vehicle.

In this case, it is required to control the vehicle to be driven remotely first. If an urgent situation arises such that remote driving is impossible, it is required to control to take temporary actions remotely and the repair to be repaired at a repair center later, but such a control technology is insufficient.

Accordingly, there is a demand for a technology for performing remote driving in a timely manner and a technique for performing a remote action for the vehicle capable of autonomous driving.

SUMMARY OF THE INVENTION

For this background, an object of the present disclosure is to provide a vehicle control device, a vehicle control system, and a vehicle control method for transferring vehicle's control right to remote control center to maintain the travel of the vehicle in if autonomous driving is impossible.

Another object of the present disclosure to provide a vehicle control apparatus, a vehicle control system, and a vehicle control method for preventing a safety accident by controlling to be taken the emergency actions by the remote control center if the driving of the vehicle is impossible.

In accordance with an aspect of the present disclosure, there is provided a vehicle control apparatus comprising: a communication device for communicating with a remote control center; and a controller configured to determine a state of each of one or more component devices related to the vehicle performing an autonomous driving, and to generate and output a determination result signal, determine a driving mode of the vehicle as one of a remote driving mode, an emergency action mode, or an autonomous driving maintenance mode based on the determination result signal, and control the vehicle according to the driving mode determined by the driving mode determiner.

In accordance with another aspect of the present disclosure, there is provided a vehicle control system comprising: a remote control center for remotely controlling the vehicle; and
    a vehicle control apparatus for controlling the vehicle,
    wherein the vehicle control apparatus comprising:
    a communication device for communicating with a remote control center; and a controller configured to determine a state of each of one or more component devices related to the vehicle performing an autonomous driving, and to generate and output a determination result signal, determine a driving mode of the vehicle as one of a remote driving mode, an emergency action mode, or an autonomous driving maintenance mode based on the determination result signal, and control the vehicle according to the driving mode determined by the driving mode determiner.

In accordance with another aspect of the present disclosure, there is provided a vehicle control method comprising: generating and outputting a determination result signal determining by determining a state of each of one or more component devices related to an autonomous driving of the vehicle in autonomous driving; determining a driving mode of the vehicle as one of a remote driving mode, an emergency action mode, or an autonomous driving maintenance mode based on the determination result signal; communicating with a remote control center; and controlling the vehicle according to the driving mode determined.

According to the present disclosure, it is possible to provide a vehicle control apparatus, a vehicle control system, and a vehicle control method for transferring a control right of the vehicle to the remote control center and maintaining the driving of the vehicle if autonomous driving is impossible.

In addition, the present disclosure can provide the vehicle control apparatus, the vehicle control system, and the vehicle control method for preventing a safety accident by receiving the emergency action from the remote control center if the driving of the vehicle is impossible.

DETAILED DESCRIPTION OF THE EXEMPLARY EMBODIMENTS

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, embodiments of the radar apparatus, the control method of the radar apparatus and the detection system using the radar apparatus according to the present disclosure will be described with reference to exemplary diagrams.

Figure 1:
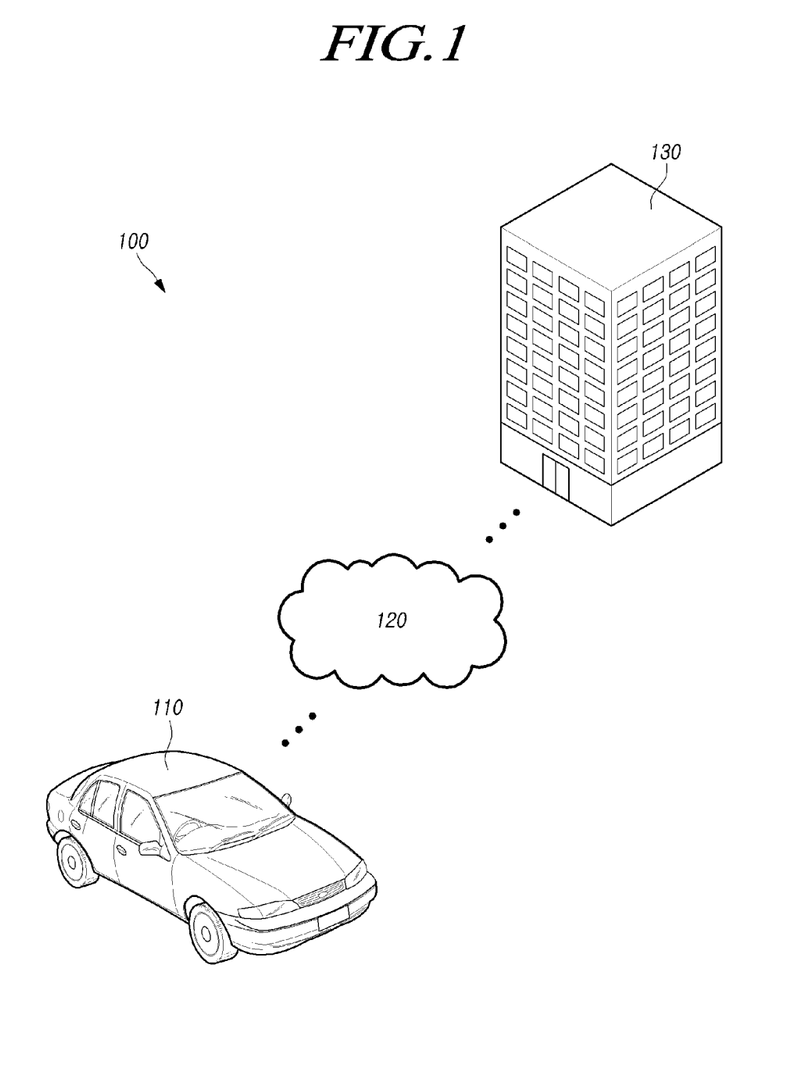
FIG. 1 is a diagram schematically illustrating the vehicle control system according to the present disclosure.

FIG. 1 is a diagram schematically illustrating the vehicle control system 100 according to the present disclosure.

Referring to FIG. 1, the vehicle control system according to the present disclosure may include the vehicle 110, the communication network 120, and the remote control center 130.

The vehicle 110 may include an advanced driver assistance systems (A-DAS) and autonomous driving systems.

In addition, in the case that it is determined that the autonomous driving of the vehicle 110 is impossible, the vehicle 110 may request the remote control to the remote control center 130 that is external to the vehicle, and may remotely operate by the remote control center 130.

Here, the case in which the autonomous driving is impossible may mean the case that the vehicle 110 may not be properly controlled due to the poor external environment such as a failure of a component mounted in the vehicle 110 or a bad weather.

Although not shown, the vehicle 110 may include one or more component devices mounted in the vehicle and the vehicle control apparatus for controlling the vehicle 110.

The communication network 120 is a network connecting the vehicle 110 and the remote control center 130. The communication network 120 may include wireless communication, wired communication, optical communication, ultrasonic communication, or a combination thereof.

The communication network 120 may be a closed communication network such as a local area network (LAN), a wide area network (WAN), or an open communication network such as the Internet.

Here, the Internet may be a global open computer communication network structure that provides a TCP/IP protocol and a number of services that exist in the upper layer, that is, Hyper Text Transfer Protocol (HTTP), Telnet, File Transfer Protocol (FTP), Domain Name System (DNS), and Simple Mail Transfer Protocol (SMTP), Simple Network Management Protocol (SNMP), Network File Service (NFS), and Network Information Service (NIS).

The remote control center 130 performs remote control of the vehicle 110 for the vehicle 110 requesting remote control. That is, the remote control center 130 may receive the remote control request signal from the vehicle 110, analyze various vehicle information for determining the current state of the vehicle 110, and transmit the remote control signal to the vehicle 110 to control the vehicle 110.

Figure 2:
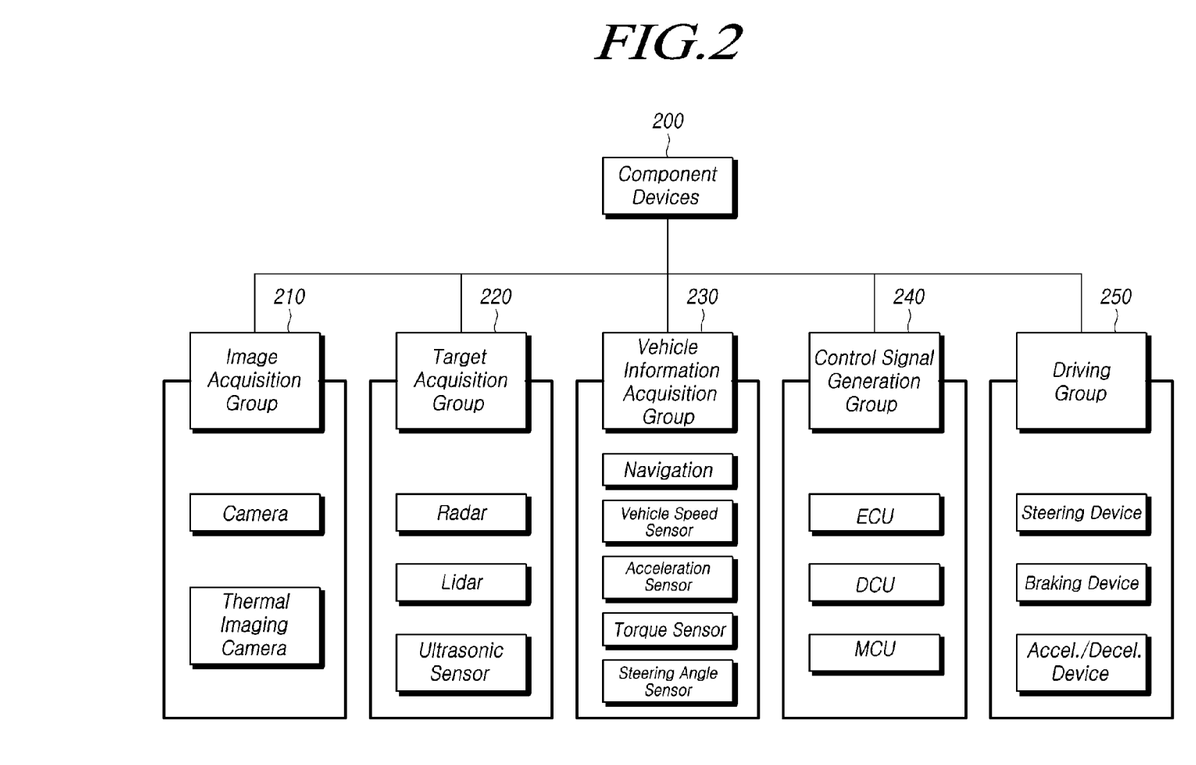
FIG. 2 is a diagram illustrating the component devices according to the present disclosure classified into each group.

FIG. 2 is a diagram illustrating the component devices according to the present disclosure classified into each group.

Referring to FIG. 2, the component device 200 according to the present disclosure may include all devices in the vehicle necessary to perform the autonomous driving function of the vehicle 110.

For example, the component device 200 may include sensors capable of detecting the target existing inside or outside the vehicle 110 or detecting driving information of the vehicle, various driving devices for actually driving the vehicle 110, and a controller for calculating a control signal for driving the driving devices.

One or more component devices 200 may be classified into various groups according to functions and purposes. For example, the one or more component devices 200 may include the image acquisition group 210 for acquiring an image around the vehicle, the target acquisition group 220 for acquiring target information around the vehicle, and the vehicle information acquisition group 230 for acquiring the vehicle information, the control signal generation group 240 for generating the control signal for controlling the behavior of the vehicle, and the driving group 250 for receiving and driving the control signal.

The image acquisition group 210 is a group of devices having a function of acquiring an image including a picture, an image, and the like around the vehicle, such as the front, the side, and the rear of the vehicle 110. Cameras, thermal imaging cameras, and the like may be included in the image acquisition group 210.

The target acquisition group 220 is a group of devices capable of acquiring an image including a picture, an image, and the like around the vehicle, such as the front, the side, and the rear of the vehicle 110. Cameras, thermal imaging cameras, and the like may be included in the image acquisition group 210.

The target acquisition group 220 is a group of devices capable of acquiring target information of targets existing around the vehicle.

Here, the target may include all other vehicles or pedestrian obstacles, and the target information may mean all information about the target, such as the distance between the vehicle 110 and the target, the speed of the target, and the direction of movement of the target.

The target acquisition group 220 may include radar, LIDAR, and ultrasonic sensors capable of acquiring target information.

The vehicle information acquisition group 230 is a group of devices capable of acquiring vehicle information of the vehicle 110.

Here, the vehicle information may mean all information about driving information of the vehicle 110 such as speed information, acceleration information, steering information, location information of the vehicle.

The vehicle information acquisition group 230 may include a navigation, a vehicle speed sensor, an acceleration sensor, a torque sensor, a steering angle sensor, and the like capable of acquiring vehicle information.

The control signal generation group 240 is a group of devices capable of calculating and transmitting a control signal to drive the driving devices. The control signal generation group 240 may include an electronic control unit (ECU), a domain control unit (DCU), a micro controller unit (MCU) and the like.

The driving group 250 is a group of devices that drive the vehicle 110 by receiving control signals and driving the vehicle 110. The driving group 250 may include the driving devices such as an acceleration/deceleration device, a steering device, braking device, a driving device, a suspension device, and an actuator.

In the case that one or more component devices 200 are classified into one or more groups according to functions and purposes, the driving mode may be determined according to the classified groups.

Figure 3:
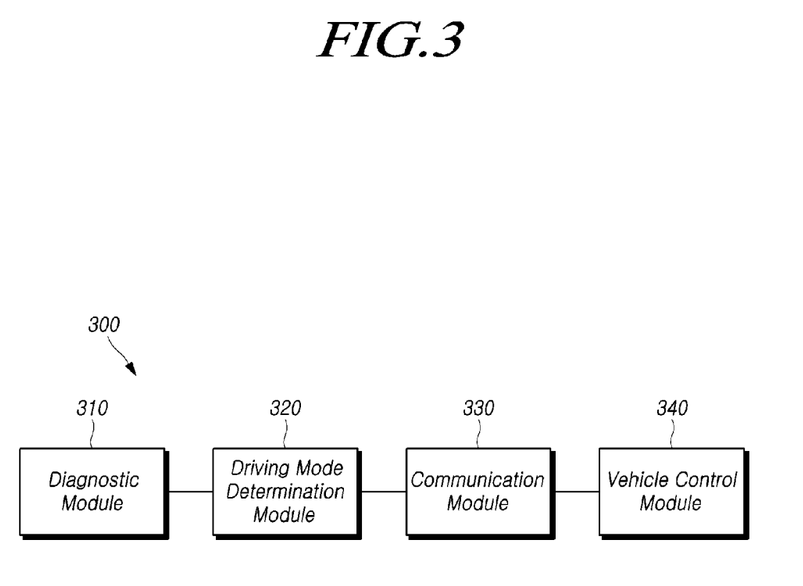
FIG. 3 is a diagram illustrating a configuration of the vehicle control apparatus according to the present disclosure.

FIG. 3 is a diagram illustrating a configuration of the vehicle control apparatus according to the present disclosure.

Referring to FIG. 3, the vehicle control apparatus 300 according to the present disclosure may include a diagnostic module 310, a driving mode determination module 320, a communication module 330, a vehicle control module 340, and the like.

In the present specification, the diagnostic module 310, the driving mode determination module 320, the communication module 330, and the vehicle control module 340 may be used in the same sense as the diagnostic device, the driving mode determiner, the communication device, and the vehicle controller, respectively.

According to an example, the diagnostic module 310, the driving mode determination module 320, and the vehicle control module 340 may be included in one or more controllers. According to an example, the controller may be implemented as an MCU or an ECU.

The diagnostic module 310 may determine the state of each of the one or more component devices 200 that perform the autonomous driving function of the autonomous vehicle 110 and may generate and output a determination result signal.

The state of the component device 200 may mean an error due to a state of an external environment, such as a failure or weather deterioration. For example, the state of the component device 200 may be the state in which the sensor, the driving device, the ECU, or the like is abnormal, the state in which the camera cannot recognize a hidden lane, a guide symbol, etc. due to heavy snow, or the state in which the camera cannot recognize an object due to dirt on the lens of the camera. However, it is not limited thereto.

According to one example of determining whether a failure of the component device 200 occurs, the diagnostic module 310 may determine whether the failure of the one or more component devices 200 occurs, may check the group including the failure component device that is determined to have the failure, may determine whether the failure component can be replaced by another component device in the group including the failure component device, and may generate a determination result signal.

Here, the determination result signal may include at least one of identification information of the failure component device according to the result of determining each state of the one or more component devices 200, group information of the group including the failure component device and replaceability information on whether to replace the failure component device.

Here, the identification information of the failure component device may include information on the type of failure component device, the position of failure component device in the vehicle 110, the model name of failure component device, and the like.

For example, if the radar has failed, the identification information of the failure of failure component device may include information on the radar, the position information disposed on the front left side of the vehicle 110 and the model name.

The group information may indicate information about the group including the failure component device among the various groups in FIG. 2.

For example, if the GPS reception function of the navigation is abnormal due to satellite communication failure, the group information may indicate the vehicle information acquisition group 230.

The replaceability information may indicate information for determining whether the failure component device can be replaced with another component that is a normal component device in the group to which the failure component device belongs.

The replaceability of failure component device may be set in consideration of whether the failure component device and the replacement component device are included in the same group and the location in the vehicle 110 of the failure component device and the replacement component device. However, it is not limited thereto.

For example, in the case that the radar disposed in the center of the front of the vehicle 110 has a failure, if there is the sensor disposed in the front center of the vehicle 110 among the LIDAR, the ultrasonic sensor, and the like included in the same group as the radar, the replaceability information may indicates that the failed radar can be replaced with another corresponding sensor.

In another example, in the case that a camera disposed in the front center of the vehicle 110 has a failure, if another camera included in the same group as the failed camera is a rear camera disposed behind the vehicle 110, the replaceability information may indicates the non-replaceable state meaning that the failed camera radar cannot be replaced with another corresponding sensor.

The diagnostic module 310 may acquire information about the driver of the vehicle 110, determine a driver's state of the vehicle 110 based on the acquired information about the driver, and generate and output the determination result signal. That is, the determination result signal may further include state information of the driver.

For this purpose, the vehicle 110 may include a device for acquiring information about the driver, such as an internal camera or a smart band. In this case, if information about the driver can be obtained, the device is not limited to the specific device.

For example, when the vehicle 110 travels, the internal camera disposed inside the vehicle 110 may acquire the driver's image and stores the initial driver's state, and the internal camera may detect whether the driver is present, the driver's gaze, movement or postures of the driver and may compare with the initial driver's state to continuously check the driver's condition.

The driving mode determination module 320 may determine the driving mode of the vehicle 110 as one of the remote driving mode, the emergency action mode, and the autonomous driving maintenance mode by using the determination result signal.

The remote driving mode may mean a mode in which a remote driver existing in the remote control center 130 can remotely drive the vehicle 110.

The emergency action mode may mean a mode in which, if the vehicle 110 is unable to drive. The vehicle receive various remote action signals from the remote control center 130 through the communication module 330 to update the software of the component device 200, reboot the component device 200, or perform an emergency rescue request operation.

The autonomous driving maintenance mode may mean a mode in which the autonomous driving can be performed since the state of the component device 200 is normal or the degree of the failure can be overcome even when the component device 200 has a failure.

As described above, in the case that the diagnostic module 310 determines the state of the driver of the vehicle 110, the driving mode determination module 320 may determine the driving mode as the remote driving mode based on the driver state information included in the determination result signal.

According to an example, the driving mode determination module 320 may determine the driving mode as the remote driving mode if it is determined that an abnormality has occurred in the driver's state based on the driver state information. That is, if it is determined that the driver cannot confirm driving or cannot drive the vehicle, such as when the driver is unconscious, the driving mode determination module 320 may determine the driving mode to the remote driving mode. According to this, it is possible to prevent an accident that may occur when the driver's control is required, such as when the autonomous driving mode is changed to the manual driving mode.

In this case, the driving mode determination module 320, as a result of analyzing the determination result signal, may change the driving mode to the emergency action mode, if the group information indicates at least one of the image acquisition group, the control signal generation group or the driving group, and if the replaceability information indicates non-replaceable. According to this, it is possible to prepare for the situation in which an abnormality occurs in the driver's state and a failure occurs in the vehicle 110.

A detailed method of determining the driving mode by the driving mode determination module 320 will be described later with reference to FIGS. 4 to 6.

The communication module 330 may communicate with the remote control center or may communicate with another communication capable terminal. The communication module 330 may include the configuration necessary for communication, such as the transmission antenna, the reception antenna, the A/D converter, the D/A converter, and the like.

The communication module 330 may be configured to transmit various signals such as detection information generated from a detection component device among the one or more component devices, vehicle information, the determination result signal output from the diagnostic module 310, the remote control request signal, and a vehicle identification signal to the remote control center 130. In addition, the communication module 330 may receive a remote control approval signal, the remote control signal, and the like from the remote control center 130.

The vehicle control module 340 may control the vehicle according to the determined driving mode.

For example, if the autonomous driving maintenance mode is determined, the vehicle control module 340 may receive input information from various sensors according to the autonomous driving maintenance mode, and may calculate the control signal and output the control signal to the driving device.

In another example, if the remote driving mode is determined, the vehicle control module 340 may output the remote control signal received from the remote control center through the communication module 330 to the driving device.

Figure 4:
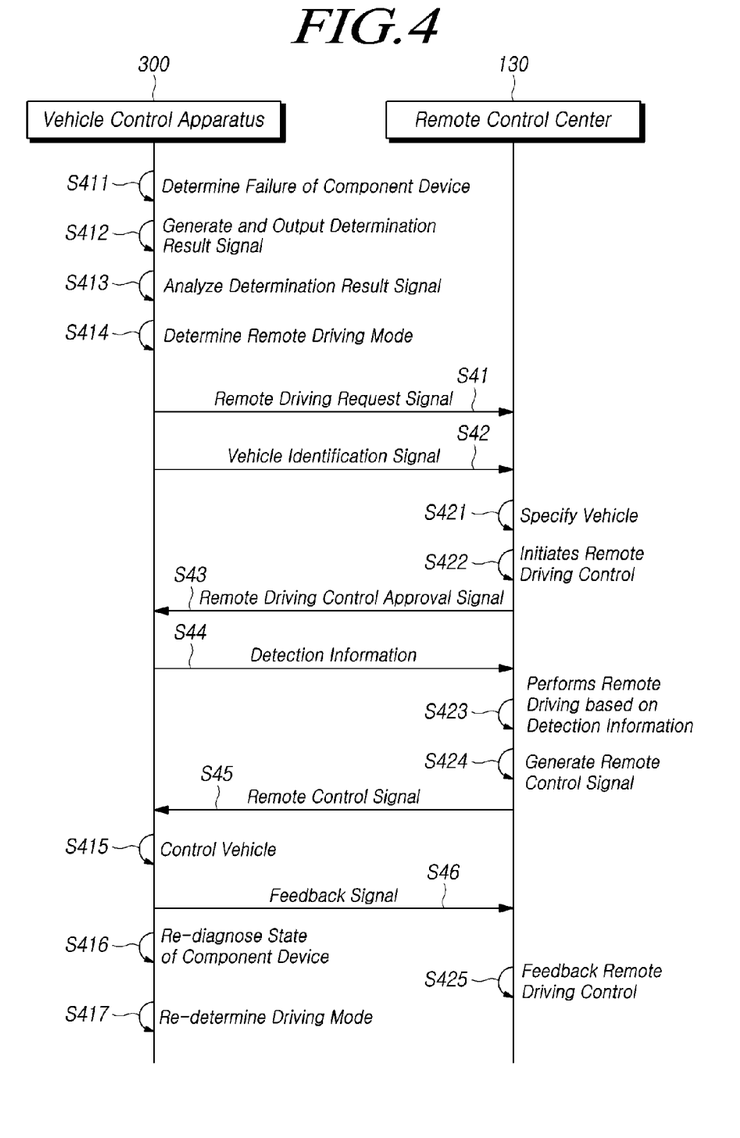
FIG. 4 is a flowchart illustrating an embodiment of the remote driving mode in the vehicle control system according to the present disclosure.

FIG. 4 is a flowchart illustrating an embodiment of the remote driving mode in the vehicle control system 100 according to the present disclosure.

Referring to FIG. 4, the diagnostic module 310 included in the vehicle control apparatus 300 according to the present disclosure may determine the state of one or more component devices 200.

For example, the diagnostic module 310 determines a failure of the component device 200 such as the radar, the ultrasonic sensor, the vehicle speed sensor or determines an error of the component device 200 due to a bad weather condition. (S411)

The diagnostic module 310 may generate the determination result signal including a result of determining the failure of the component device and output the determination result signal to the driving mode determination module 320 (S412).

The driving mode determination module 320 included in the vehicle control apparatus 300 according to the present disclosure may analyze the received determination result signal (S413).

The driving mode determination module 320 analyzes the determination result signal. In addition, if the group information indicates the target acquiring group 220 or the vehicle information acquiring group 230 and the replaceability information indicates a non-replaceable state, the driving mode determination module 320 determines the driving mode to the remote driving mode. (S414)

In the case that the remote driving mode is determined, the communication module 330 included in the vehicle control apparatus 300 according to the present disclosure may transmit the remote driving request signal to the remote control center 130. (S41) In addition, the communication module 330 transmits a vehicle identification signal to the remote control center 130 so that the remote control center 130 distinguishes the vehicle 110 from other vehicles. (S42)

The remote control center 130 receives the remote driving request signal and the vehicle identification signal, queries the vehicle 110 to specify the vehicle 110, and initiates the remote driving control. (S421, S422)

The remote control center 130 may generate a remote driving control approval signal and transmit it to the vehicle control apparatus 300. (S43)

In this case, the remote driver of the remote control center 130 may perform remote driving by using detection information such as the image capturing the surroundings of the vehicle 110.

The communication module 330 transmits the detection information generated from the detection component device or sensing component device among the one or more component devices 200 to the remote control center 130. (S44)

The remote control center 130 performs remote driving based on the detection information. (S423)

For example, the remote driver of the remote control center 130 may use the received image information to determine the road conditions of the road surrounding the vehicle 110, and may perform remote driving by acceleration, deceleration, controlling of steering, braking, or a combination thereof in response to the surrounding road conditions.

The remote control center 130 may generate the remote control signal corresponding to the remote driving (S424). The remote control center 130 may transmit the remote control signal to the vehicle control apparatus 300. (S45)

The vehicle control module 340 included in the vehicle control apparatus 300 according to the present disclosure may control the behavior of the vehicle 110 based on the remote control signal received through the communication module 330. (S415)

For example, if the remote driver of the remote control center 130 performs the remote driving of the left turn steering, the vehicle control module 340 interprets the remote control signal received through the communication module 330 as the left turn steering information and transmit the remote control signal to the steering device. The steering device receives the remote control signal and drives the vehicle 110 to turn left.

The communication module 3300 transmits a feedback signal including remote control result information to the remote control center 130. (S46)

The remote control center 130 may evaluate the capability of the remote driver by receiving the feedback signal and feeding back the performance of performing the remote driving control.

The diagnostic module 310 included in the vehicle control apparatus 300 according to the present disclosure may re-diagnose the state of the component device 200 and may re-determine the driving mode according to the re-diagnosis result. (S416, S417)

Figure 5:
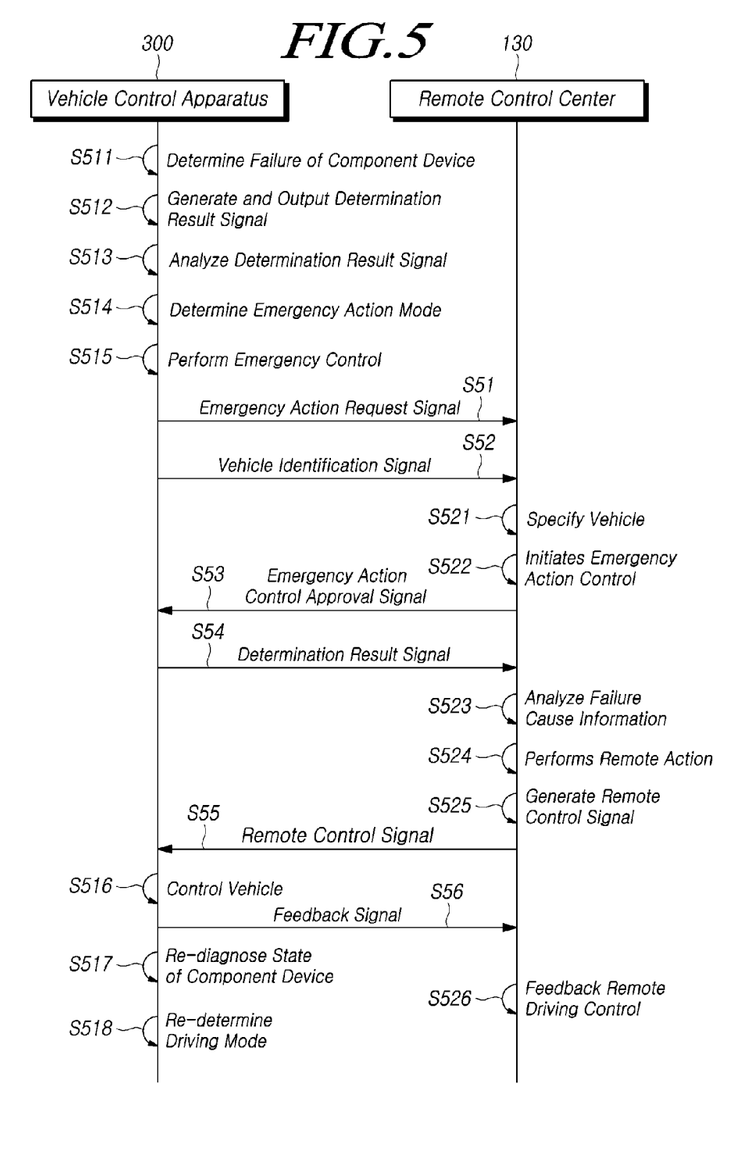
FIG. 5 is a flowchart illustrating an embodiment of the emergency action mode in the vehicle control system according to the present disclosure.

FIG. 5 is a flowchart illustrating an embodiment of the emergency action mode in the vehicle control system 100 according to the present disclosure.

Referring to FIG. 5, the diagnostic module 310 included in the vehicle control apparatus 300 according to the present disclosure may determine the state of one or more component devices 200.

For example, the diagnostic module 310 may determine the failure of the component device such as the camera, the actuator, or the ECU. (S511)

The diagnostic module 310 may generate the determination result signal including a result of determining the failure of the component device 200 and output the determination result signal to the driving mode determination module 320. (S512)

The driving mode determination module 320 analyzes the determination result signal. In addition, if the group information indicates any one of the image acquisition group 210, the control signal generation group 240 and the driving group 250 and the replaceability information indicates the non-replaceable state, the driving mode determination module 320 determines the driving mode to the emergency action mode. (S414)

In this case, if the emergency action mode is determined, the vehicle control module 340 included in the vehicle control apparatus 300 according to the present disclosure may perform the emergency control to preferentially control the behavior of the vehicle 110 based on at least one control signal of the emergency stop control signal and the emergency avoidance control signal. (S515)

Here, the emergency stop control signal may mean a control signal to emergently stop the vehicle 110 and generate an emergency light and an alarm sound, and the emergency avoidance control signal may mean a control signal to steer the vehicle 110 in a shoulder.

If the emergency action mode is determined, the communication module 330 included in the vehicle control apparatus 300 according to the present disclosure transmits the emergency action request signal to the remote control center 130. (S51) The communication module 330 transmits the vehicle identification signal to the remote control center 130 so that the remote control center 130 may distinguish the vehicle 110 from other vehicles. (S52)

The remote control center 130 receives the emergency action request signal and the vehicle identification signal, inquires the vehicle 110 to specify the vehicle 110, and initiates emergency action control. (S521, S522)

The remote control center 130 generates an emergency action control approval signal and transmits the emergency action control approval signal to the vehicle control apparatus 300. (S53)

In this case, the remote operator of the remote control center 130 may perform remote actions by using the diagnostic information and failure cause information of the failure component device of the vehicle 110.

The communication module 330 transmits a determination result signal including diagnostic information, failure cause information, etc. of the failure component device to the remote control center. (S54)

The remote control center 130 receives the determination result signal, analyzes the failure cause information and performs the remote action corresponding to the failure cause information. (S523, S524)

For example, the remote operator of the remote control center 130 may check the error of the software of the failure component device using the failure cause information, and take action to force reboot the failure component.

In another example, the remote operator of the remote control center 130 may check the defect of the hardware of the failure component device using the failure cause information, and take action to notify the repair center of the location information and the cause of the failure of the vehicle 110.

The remote control center 130 may generate the remote control signal corresponding to the remote action. The remote control center 130 may transmit the remote control signal to the vehicle control apparatus 300. (S525, S55)

The vehicle control module 340 may control the vehicle 110 to perform at least one of an operation of initiating a rescue request in the vehicle 110 and restoring software of the failure component device based on the remote control signal received through the communication module 330. (S516)

For example, in the case that the remote operator of the remote control center 130 takes action to restore the software of the ECU, the vehicle control module 340 transmits the remote control signal received through the communication module 330 to the ECU. The ECU receives the remote control signal and performs the operation of restoring the software.

In another embodiment, in the case that the remote operator of the remote control center 130 takes an action requesting rescue, the vehicle control module 340 transmits the remote control signal received through the communication module 330 to the communication module 330 and the alarm device. The communication module 330 receives the remote control signal and transmits the current location information of the vehicle 110, the failure cause information, and the like to the repair center, and the alarm device receives the remote control signal to generate the alarm sound and turn on the warning light.

The communication module 330 generates a feedback signal including the remote control result information and transmits the feedback signal to the remote control center 130. (S56)

The remote control center 130 may receive the feedback signal to evaluate the performance of remote action control.

Meanwhile, the diagnostic module 310 included in the vehicle control apparatus 300 according to the present disclosure may re-diagnose the state of the component device 200 and may re-determine the driving mode according to the re-diagnostic result. (S517, S518)

Figure 6:
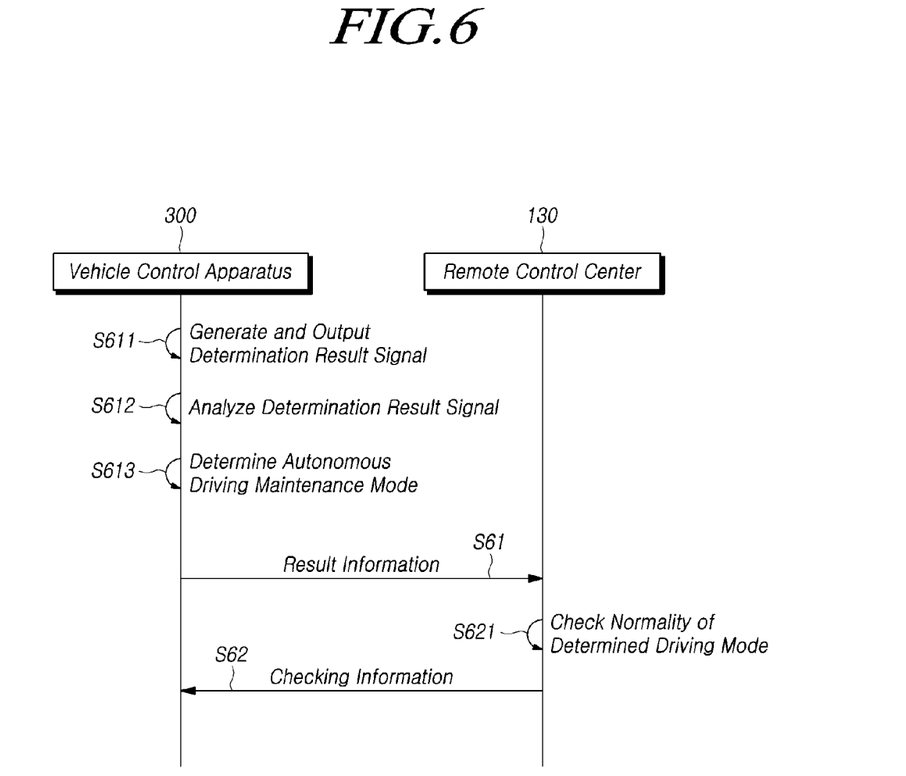
FIG. 6 is a flowchart illustrating an embodiment of the autonomous driving maintenance mode in the vehicle control system according to the present disclosure.

FIG. 6 is a flowchart illustrating an embodiment of the autonomous driving maintenance mode in the vehicle control system 100 according to the present disclosure.

Referring to FIG. 6, the diagnostic module 310 included in the vehicle control apparatus 300 according to the present disclosure determines the state of one or more component devices 200, generates the determination result signal, and outputs the determination result signal to the driving mode determination module 320. (S611)

For example, if the component device 200 operates normally, the diagnostic module 310 determines that the component device 200 is normal, generates the determination result signal indicating that the component device 200 is in a normal state, and outputs the determination result signal to the driving mode determination module 320. (S611)

In another example, the diagnostic module 310 determines the failure of the component device 200 such as the radar, the vehicle speed sensor and the ECU, and generates the determination result signal and outputs the determination result signal to the driving mode determination module 320.

The driving mode determination module 320 included in the vehicle control apparatus 300 according to the present disclosure analyzes the received determination result signal. (S612)

The driving mode determination module 320 analyzes the determination result signal. If identification information does not exist or the group information indicates at least one of the target acquisition group 220, the vehicle information acquisition group 230 or the control signal generation group 240, and if the replaceability information indicates the replaceable state, the driving mode determination module 320 determines the driving mode as the autonomous driving maintenance mode. (S613)

For example, if the component device 200 is in a normal state, since there is no identification information of the failure component device, the driving mode determination module 320 may determine the driving mode as the autonomous driving maintenance mode.

In another example, if it is determined that the failed radar can be replaced with the LIDAR disposed at a similar position according to the algorithm for determining whether the replacement is possible, the driving mode determination module 320 may determine the driving mode as the autonomous driving maintenance mode by using the identification information indicating the radar and the group information indicating the target acquisition group 220.

If the autonomous driving maintenance mode is determined, the vehicle 110 equipped with the vehicle control apparatus 300 according to the present disclosure may perform autonomous driving without control of the remote control center 130.

Meanwhile, in order to maintain autonomous driving more safely, the vehicle control apparatus 300 according to the present disclosure may supplement the autonomous driving function by transmitting the result information to the remote control center 130. (S61)

The remote control center 130 may receive the result information and check whether the driving mode is abnormal. (S621)

For example, the remote control center 130 may check whether the autonomous driving maintenance mode is appropriate by using the received result information.

Although not shown, the remote control center 130 may generate and transmit the remote control signal to the vehicle control device 300 in order to update the software of the failure component device or reboot the failure component device by using the received result information.

As described above, the entity for determining the driving mode in the vehicle control system 100 according to the present disclosure illustrated in FIGS. 3 to 6 is the vehicle control apparatus 300.

Figure 7:
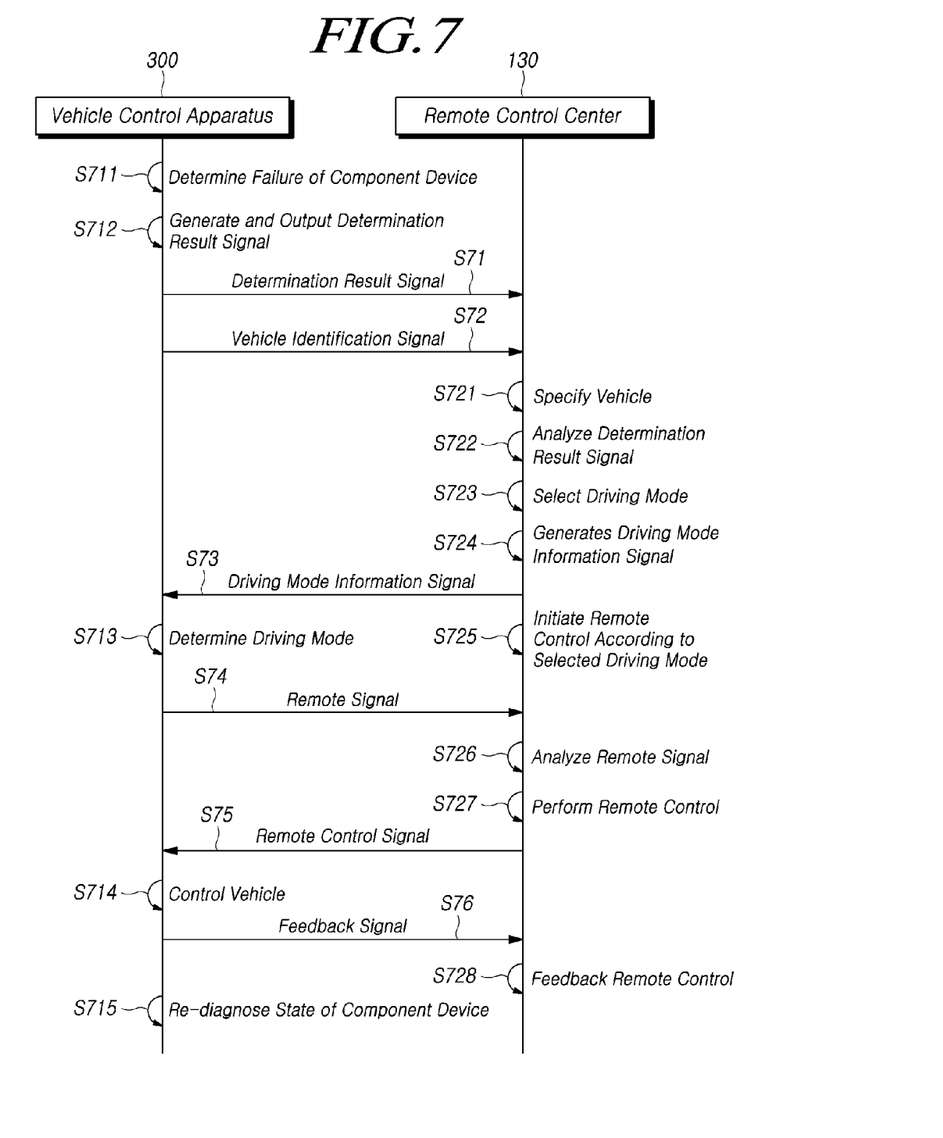
FIG. 7 is a flowchart illustrating an embodiment of a process of determining the driving mode in the vehicle control system according to the present disclosure.

FIG. 7 is a flowchart illustrating an embodiment of a process of determining the driving mode in the vehicle control system 100 according to the present disclosure.

Referring to FIG. 7, the diagnostic module 310 of the vehicle control apparatus 300 according to the present disclosure determines the state of the component devices 200, generates the determination result signal, and outputs the determination result signal to the communication module 330. (S711, S712)

The communication module 330 of the vehicle control apparatus 300 according to the present disclosure transmits the determination result signal to the remote control center 130. (S71) The communication module 330 transmits the vehicle identification signal to the remote control center 130. (S72)

The remote control center 130 receives the determination result signal and the vehicle identification signal. The remote control center 130 inquires the vehicle 110 using the vehicle identification signal, selects the driving mode by analyzing the determination result signal. (S721, S722, S723)

For example, the remote control center 130 analyzes the determination result signal and determines the driving mode as the remote driving mode.

The remote control center 130 generates a driving mode information signal indicating the determined driving mode and transmits the generated driving mode information signal to the vehicle control apparatus 300. (S724, S73)

The driving mode determination mode 330 included in the vehicle control apparatus 300 according to the present disclosure finally determines the driving mode by analyzing the driving mode information signal received from the remote control center 130. (S713)

The communication module 330 included in the vehicle control apparatus 300 according to the present disclosure transmits the remote signal including the detection information, diagnostic information of the failure component device, failure cause information, and the like in accordance with the determined driving mode to the remote control center 130. (S74)

For example, in the case that the remote driving mode is determined, the communication module 330 transmits the remote signal including the detection information to the remote control center 130.

The remote control center 130 analyzes the received remote signal, performs remote control, and transmits the remote control signal to the vehicle control apparatus 300. (S726, S75)

For example, the remote control center 130 analyzes the detection information included in the remote signal, performs steering control, and transmits the remote control signal including the steering control information to the vehicle control apparatus 300.

Subsequent operations are the same as described above with reference to FIGS. 4 to 6, and will be omitted.

As described above, in the vehicle control system 100 according to the present disclosure, the remote control center 130 determines the driving mode, thereby preventing malfunction.

Hereinafter, the vehicle control method capable of performing functions in the present disclosure will be described with reference to FIG. 8.

Figure 8:
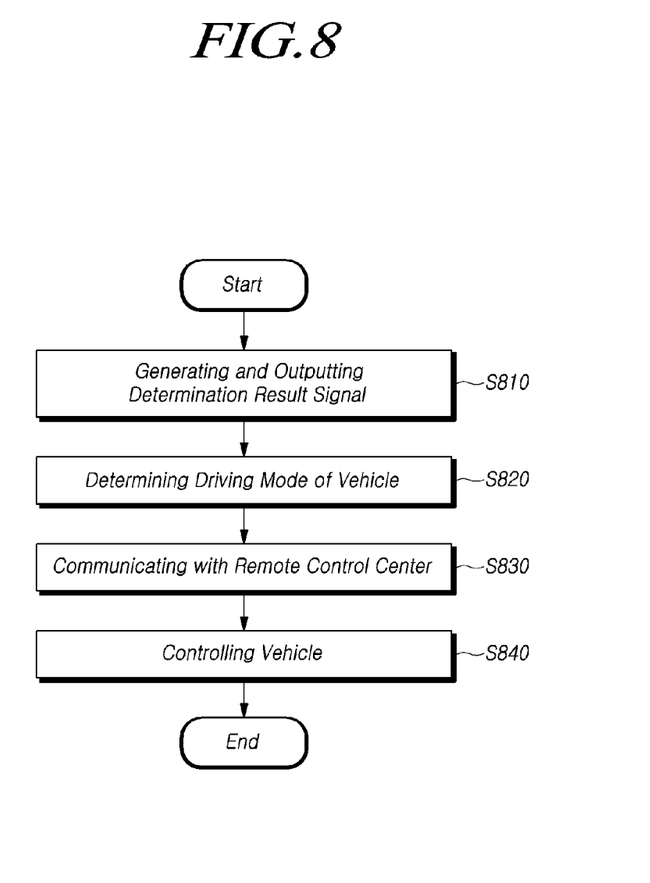
FIG. 8 is a flowchart illustrating the vehicle control method according to the present disclosure.

FIG. 8 is a flowchart illustrating the vehicle control method according to the present disclosure.

Referring to FIG. 8, the vehicle control method according to the present disclosure may include the step S810 for generating and outputting the determination result signal determining by determining the state of each of one or more component devices related to the autonomous driving of the vehicle in autonomous driving, the step S820 for determining the driving mode of the vehicle as one of a remote driving mode, an emergency action mode, or an autonomous driving maintenance mode based on the determination result signal, the step S830 for communicating with the remote control center, and the step S840 for controlling the vehicle according to the determined driving mode.

As discussed above, according to the present disclosure, it is possible to provide the vehicle control apparatus, the vehicle control system, and the vehicle control method for transferring a control right of the vehicle to the remote control center and maintaining the driving of the vehicle if autonomous driving is impossible.

Furthermore, according to the present disclosure, it is possible to provide the vehicle control apparatus, the vehicle control system, and the vehicle control method for preventing a safety accident by being provided with the emergency action from the remote control center if the driving of the vehicle is impossible.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A vehicle control apparatus comprising:
a communication device for communicating with a remote control center; and
a controller configured to:
determine a state of each of one or more component devices related to the vehicle performing an autonomous driving, and to generate and output a determination result signal,
determine a driving mode of the vehicle as one of a remote driving mode, an emergency action mode, or an autonomous driving maintenance mode based on the determination result signal, and
control the vehicle according to the driving mode determined by the driving mode determiner,
wherein the determination result signal includes at least one information of identification information of the failure component device according to a result of determining a state of each of the one or more component devices, group information of a group including the failure component device, and replaceability information on whether the failure component device can be replaced.

2. The vehicle control apparatus of claim 1, wherein the one or more component devices are classified into an image acquisition group for acquiring an image around the vehicle, a target acquisition group for acquiring target information about the vehicle, a vehicle information acquisition group for acquiring vehicle information, a control signal generation group for generating a control signal for controlling a behavior of the vehicle, and a driving group for receiving and driving the control signal.

3. The vehicle control apparatus of claim 2, wherein the controller determines whether or not a failure of each of the one or more component devices occurs, confirms the group including a failure component device determined to have the failure, and determines whether it is possible to replace the failure component device with other component devices in the group including the failure component device, and generates the determination result signal.

4. The vehicle control apparatus of claim 1, wherein the controller, as a result of analyzing the determination result signal, determines the driving mode as the remote driving mode, if the group information indicates the target acquisition group or the vehicle information acquisition group, and if the replaceability information indicates non-replaceable.

5. The vehicle control apparatus of claim 4, wherein the communication device transmits detection information generated from a detecting component of the one or more component devices to the remote control center, and the controller controls the behavior of the vehicle based on a remote control signal received through the communication device.

6. The vehicle control apparatus of claim 1, wherein the controller, as a result of analyzing the determination result signal, determines the driving mode as the emergency action mode, if the group information indicates at least one of the image acquisition group, the control signal generation group or the driving group, and if the replaceability information indicates non-replaceable.

7. The vehicle control apparatus of claim 6, wherein the communication device transmits the determination result signal to the remote control center, and the controller, if the emergency action mode is determined, controls the vehicle to preferentially control the behavior of the vehicle based on at least one control signal of an emergency stop control signal or an emergency avoidance control signal, and to perform at least one of initiating a rescue request in the vehicle or restoring software of the failure component device.

8. The vehicle control apparatus of claim 1, wherein the controller, as a result of analyzing the determination result signal, determines the driving mode as the autonomous driving maintenance mode, if the identification information does not exist or the group information indicates at least one of the target acquisition group, the vehicle information acquisition group or the control signal generation group, and if the replaceability information indicates replaceable.

9. The vehicle control apparatus of claim 1, wherein the controller acquires information about a driver of the vehicle and determines a state of the driver of the vehicle based on the acquired information about the driver, and if it is determined that an abnormality occurs in the state of the driver, determines the driving mode as the remote driving mode.

10. The vehicle control apparatus of claim 9, wherein the determination result signal further includes state information of the driver.

11. The vehicle control apparatus of claim 10, wherein the controller, as a result of analyzing the determination result signal, changes the driving mode to the emergency action mode, if the group information indicates at least one of the image acquisition group, the control signal generation group or the driving group, and if the replaceability information indicates non-replaceable.

12. A vehicle control system comprising:
a remote control center for remotely controlling the vehicle; and
a vehicle control apparatus for controlling the vehicle, wherein the vehicle control apparatus comprising:
a communication device for communicating with a remote control center; and
a controller configured to:
determine a state of each of one or more component devices related to the vehicle performing an autonomous driving, and to generate and output a determination result signal,
determine a driving mode of the vehicle as one of a remote driving mode, an emergency action mode, or an autonomous driving maintenance mode based on the determination result signal, and
control the vehicle according to the driving mode determined by the driving mode determiner,
wherein the determination result signal includes at least one information of identification information of a failure component device according to a result of determining a state of each of the one or more component devices, group information of a group including the failure component device, and replaceability information on whether the failure component device can be replaced.

13. The vehicle control system of claim 12, wherein the controller, as a result of analyzing the determination result signal, determines the driving mode as the remote driving mode, if the group information indicates a target acquisition group or a vehicle information acquisition group, and if the replaceability information indicates non-replaceable.

14. The vehicle control system of claim 13, wherein the communication device transmits detection information generated from a detecting component of the one or more component devices to the remote control center, and the controller controls the behavior of the vehicle based on a remote control signal received through the communication device.

15. The vehicle control system of claim 12, wherein the controller, as a result of analyzing the determination result signal, determines the driving mode as the emergency action mode, if the group information indicates at least one of an image acquisition group, a control signal generation group or a driving group, and if the replaceability information indicates non-replaceable.

16. The vehicle control system of claim 15, wherein the communication device transmits the determination result signal to the remote control center, and the controller, if the emergency action mode is determined, controls the vehicle to preferentially control the behavior of the vehicle based on at least one control signal of an emergency stop control signal or an emergency avoidance control signal, and to perform at least one of initiating a rescue request based on a remote control signal received through the communication device or restoring software of the failure component device.

17. The vehicle control system of claim 12, wherein the controller, as a result of analyzing the determination result signal, determines the driving mode as the autonomous driving maintenance mode, if the identification information does not exist or the group information indicates at least one of a target acquisition group, a vehicle information acquisition group or a control signal generation group, and if the replaceability information indicates replaceable.

18. A vehicle control method comprising:
generating and outputting a determination result signal determining by determining a state of each of one or more component devices related to an autonomous driving of the vehicle in autonomous driving;
determining a driving mode of the vehicle as one of a remote driving mode, an emergency action mode, or an autonomous driving maintenance mode based on the determination result signal;
communicating with a remote control center; and
controlling the vehicle according to the driving mode determined,
wherein the determination result signal includes at least one information of identification information of a failure component device according to a result of determining a state of each of the one or more component devices, group information of a group including the failure component device, and replaceability information on whether the failure component device can be replaced.

* * * * *